Aug. 13, 1929.　　　J. M. PARROTT　　　1,724,774
TRACTOR
Filed Jan. 14, 1927　　　2 Sheets-Sheet 1
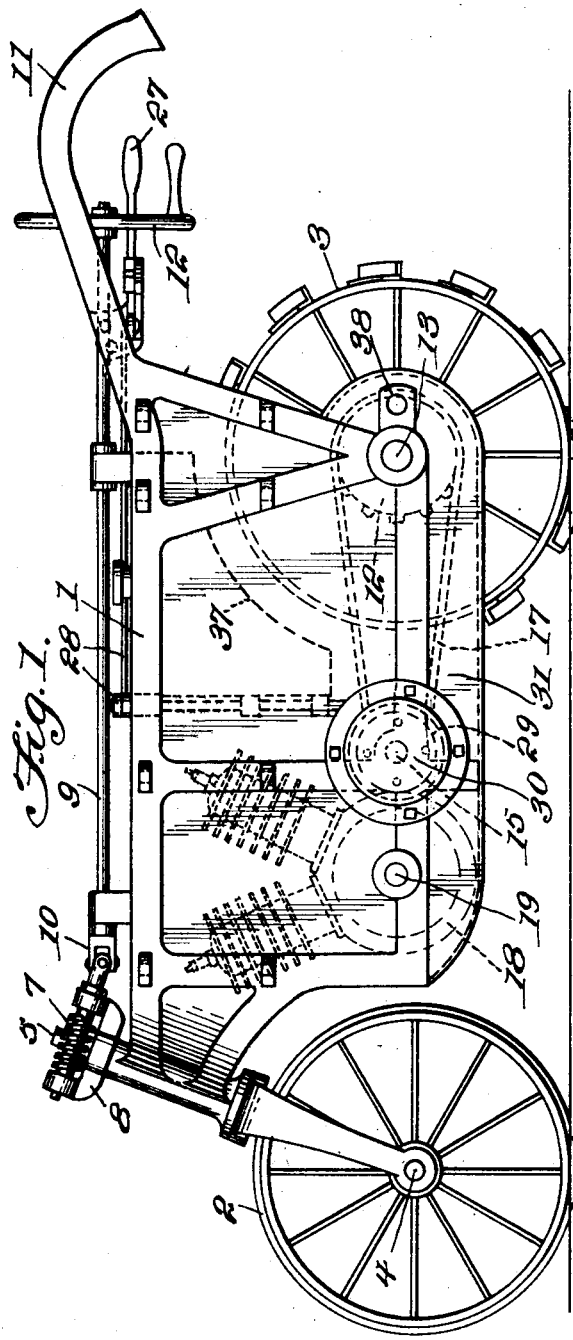
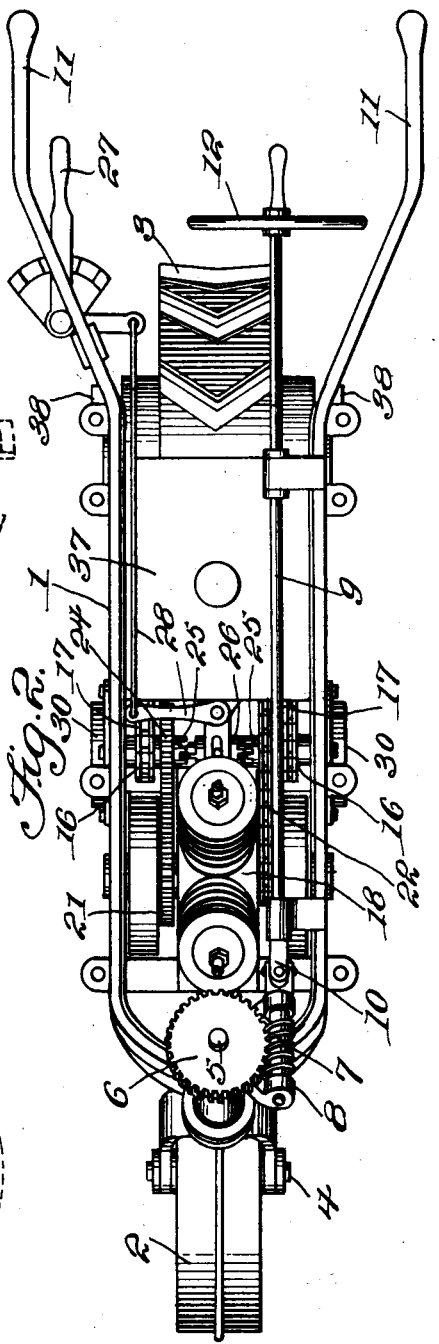
James M. Parrott INVENTOR
BY 
ATTORNEY
WITNESS:

Aug. 13, 1929.  J. M. PARROTT  1,724,774
TRACTOR
Filed Jan. 14, 1927   2 Sheets-Sheet 2
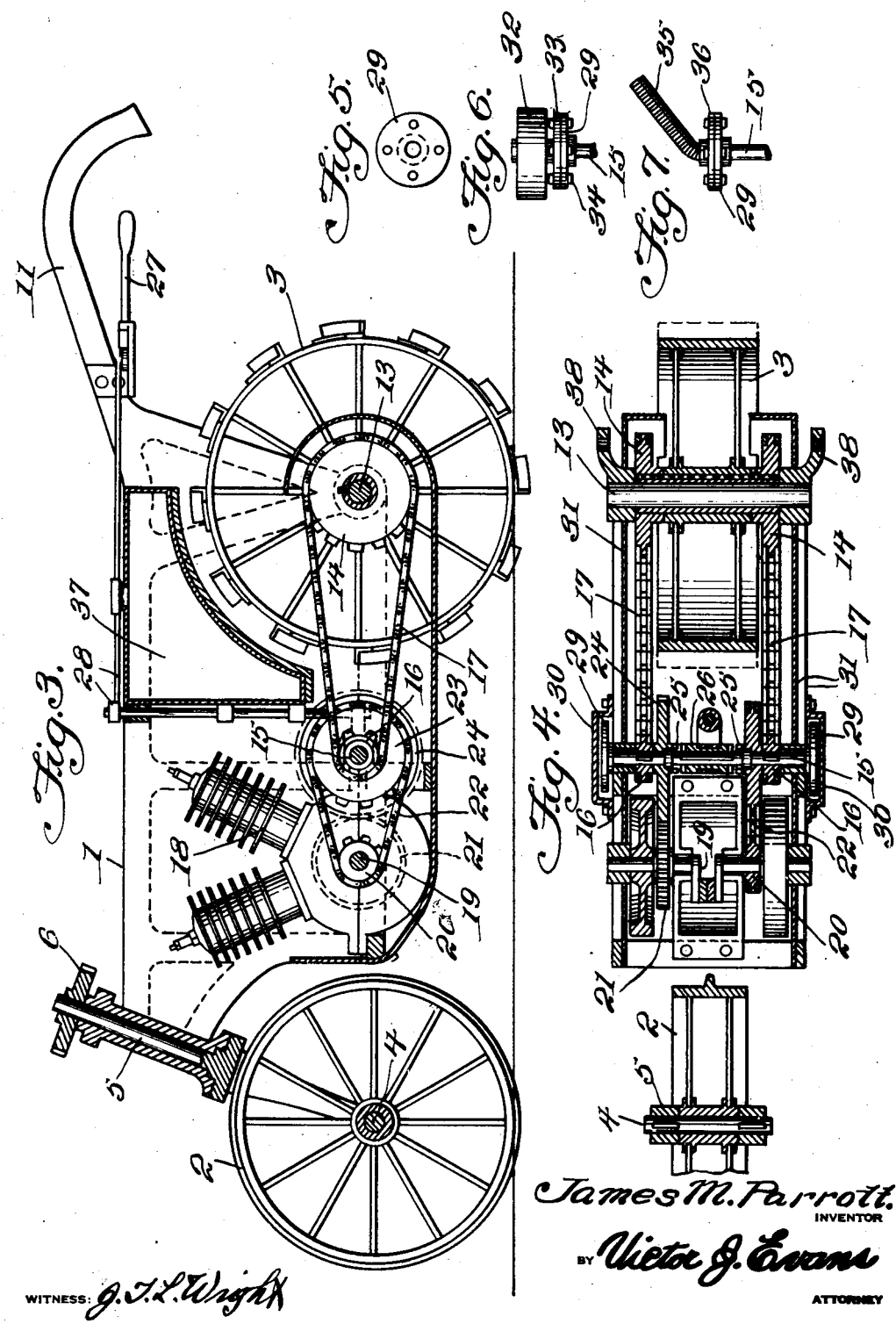
James M. Parrott.
INVENTOR
BY Victor J. Evans
ATTORNEY
WITNESS: J. T. L. Wright Patented Aug. 13, 1929.

1,724,774

UNITED STATES PATENT OFFICE.

JAMES MILTON PARROTT, OF BRICEVILLE, TENNESSEE.

TRACTOR.

Application filed January 14, 1927. Serial No. 161,154.

This invention relates to a tractor, the general object of the invention being to provide a small tractor which can be used in place of a horse or mule to perform various operations on a farm or other place.

Another object of the invention is to provide means whereby machinery on the tractor can be operated from the engine thereof while the tractor is running along with means for running stationary machinery from the tractor while the same is stationary.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of the improved tractor.

Figure 2 is a plan view.

Figure 3 is an elevation with parts in section.

Figure 4 is a horizontal sectional view.

Figures 5, 6 and 7 are detail views of attachments for the driven shaft.

In these views 1 indicates a frame which is supported by a front wheel 2 and a rear wheel 3, the axel 4 for the front wheel being carried by the forked part of a steering column 5 rotatably mounted in the forward part of the frame and which has a worm gear 6 at its upper end, meshing with a worm 7 carried in a fork 8 on a part of the frame and which is connected to a rod 9 by flexible joint 10. This rod is mounted on the top of the frame and extends between the handles 11 at the rear of the frame and has attached to its rear end a hand wheel 12. These parts permit the device to be steered by a person at the rear of the same. The rear wheel 3 is carried by the axel 13 and said axel has fastened thereon a pair of sprockets 14. A shaft 15 is journaled in the frame and has keyed thereto a pair of small sprockets 16 and a chain 17 passes over each set of sprockets 14 and 16 so that the motion of shaft 15 will be communicated to the axel 13 and thus to the drive wheel 3. A motor 18 is supported in the frame and the crank shaft 19 of said motor has a sprocket 20 thereon and a gear 21. A chain 22 passes over the sprocket 20 and over a sprocket 23 loosely mounted on the shaft 15 and the gear 21 meshes with the gear 24 loosely mounted on shaft 15. Thus the sprocket 23 is rotated in one direction by the motor and the gear 24 in an opposite direction. The sprocket 23 and gear 24 are each provided with a clutch part 25 and a clutch member 26 keyed to the shaft 15 is adapted to engage with either clutch part when the clutch member is moved in either direction from the neutral position so that the shaft 15 can be driven in either direction from the engine by moving the clutch member in engagement with either the sprocket 23 or the gear 24 and as the shaft 13 is connected with the shaft 15 the rear wheel will also be driven in either direction so that the device can be driven forwardly or reversed as desired. The clutch member 26 is shifted by means of the hand lever 29 located adjacent one of the handles 11 through means of the connections 28 which lead from the hand lever to the clutch member.

A perforated disc 29 is connected to each end of the shaft 15 and these discs are normally inclosed by a casing 30 which is bolted to the main casing 31 of the tractor. A pulley 32 may be attached to either disc by its flange 33 having perforations therein for receiving bolts 34 which pass through the perforations in the disc 29. Such a pulley is shown in Figure 5. A flexible shaft 35 may have its flange 36 bolted to one of the discs 29 so that the shaft can be used for driving various kinds of machinery placed on the tractor, such as drills and the like, or it may be used to drive stationary machinery. The pulley 32 can be used for driving the stationary machinery or the like from the tractor. In the latter case the rear wheel must be either disconnected from the driven shaft or else the tractor jacked up to space the rear wheel from the ground. When the flexible shaft 35 is used to drive machinery placed on the tractor the same is operated from the driven shaft as the tractor travels along.

The gas tank is shown at 37 and the draw bars at 38.

From the foregoing it will be seen that I have provided a two-wheel tractor which can be used in almost any place or condition that a horse or mule can be used. The operator walks along at the rear of the tractor and steadies the same with one hand on one of the handles. This leaves the other hand free to manipulate the steering wheel 12 and to operate the clutch lever 27. The tractor can be driven forwardly or rearwardly by shifting the clutch and a pulley can be connected with the driven wheel to operate other machinery and a flexible shaft can also be connected with the driven wheel to operate drills and the like placed on the tractor or machinery placed close to the same.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A tractor comprising a frame, a front wheel swiveled to the frame at its front end, a rear wheel rotatably mounted in the frame, a jack shaft, means for driving the rear wheel from the jack shaft, a sprocket loosely mounted on the jack shaft, a gear loosely mounted on the jack shaft, clutch means for connecting the sprocket with the jack shaft or the gear with the jack shaft, a motor supported by the frame, a sprocket on the shaft thereof, a chain passing over the said sprocket and the sprocket on the jack shaft, a gear on the motor shaft meshing with the gear on the jack shaft and hand operated means for moving the clutch means from a neutral position into engagement with either the sprocket or the gear on the jack shaft.

In testimony whereof I affix my signature.

JAMES M. PARROTT.